(12) United States Patent
Pang

(10) Patent No.: US 9,008,144 B2
(45) Date of Patent: Apr. 14, 2015

(54) LOW NOISE OPTICALLY PUMPED LASER STRUCTURES UTILIZING DISPERSION ELEMENTS

(71) Applicant: Henry Yang Pang, San Jose, CA (US)

(72) Inventor: Henry Yang Pang, San Jose, CA (US)

(*) Notice: Subject to any disclaimer, the term of this patent is extended or adjusted under 35 U.S.C. 154(b) by 0 days.

(21) Appl. No.: 13/626,747

(22) Filed: Sep. 25, 2012

(65) Prior Publication Data

US 2013/0188663 A1    Jul. 25, 2013

Related U.S. Application Data

(60) Provisional application No. 61/589,294, filed on Jan. 20, 2012.

(51) Int. Cl.
| | |
|---|---|
| H01S 3/091 | (2006.01) |
| H01S 3/08 | (2006.01) |
| H01S 3/16 | (2006.01) |
| H01S 3/06 | (2006.01) |
| H01S 3/07 | (2006.01) |
| H01S 3/081 | (2006.01) |
| H01S 3/0941 | (2006.01) |
| H01S 3/109 | (2006.01) |

(52) U.S. Cl.
CPC .......... *H01S 3/08004* (2013.01); *H01S 3/1611* (2013.01); *H01S 3/1673* (2013.01); *H01S 3/0621* (2013.01); *H01S 3/07* (2013.01); *H01S 3/0811* (2013.01); *H01S 3/09415* (2013.01); *H01S 3/109* (2013.01); *H01S 3/0615* (2013.01)

(58) Field of Classification Search
CPC ............. H01S 3/00; H01S 3/083; H01S 3/10; H01S 3/105
USPC ............................................................ 372/70
See application file for complete search history.

(56) References Cited

U.S. PATENT DOCUMENTS

| | | | | | |
|---|---|---|---|---|---|
| 3,531,736 | A | * | 9/1970 | Smith ............................. | 372/18 |
| 3,639,855 | A | * | 2/1972 | Dillon et al. .................... | 372/27 |
| 3,646,468 | A | * | 2/1972 | Buczek et al. .................. | 372/94 |
| 4,413,342 | A | * | 11/1983 | Cohen et al. .................... | 372/22 |
| 4,928,282 | A | * | 5/1990 | Barthelemy et al. ............ | 372/18 |
| 5,173,908 | A | * | 12/1992 | Negus et al. .................... | 372/18 |
| 5,307,358 | A | * | 4/1994 | Scheps ............................ | 372/20 |
| 5,333,142 | A | * | 7/1994 | Scheps ............................ | 372/22 |
| 5,446,749 | A | * | 8/1995 | Nighan et al. .................. | 372/22 |
| 5,541,946 | A | * | 7/1996 | Scheps et al. ................... | 372/23 |
| 5,850,407 | A | * | 12/1998 | Grossman et al. .............. | 372/22 |
| 5,870,415 | A | * | 2/1999 | Tsunekane ...................... | 372/22 |

(Continued)

OTHER PUBLICATIONS

"Nd:YAG laser", http://en.wikipedia.org/wiki/Nd:YAG_laser, printed Oct. 1, 2013.*

(Continued)

*Primary Examiner* — Xinning Niu
*Assistant Examiner* — Vu A Vu

(57) ABSTRACT

A refractive optics-based dispersion control structure for a low-noise solid state laser standing-wave resonator has at least one dispersive element, a gain medium, and a frequency doubling element disposed in the resonant beam path. The dispersive element provides geometric-based laser bandwidth control that minimizes the laser output power noise. The dispersive element in certain embodiments may be a prism. The dispersive element in certain other embodiments may be integrally formed with the gain medium. Numerous different architectures using these elements are disclosed.

20 Claims, 9 Drawing Sheets

(56) References Cited

U.S. PATENT DOCUMENTS

| | | | | |
|---|---|---|---|---|
| 6,081,369 | A | * | 6/2000 | Waarts et al. ............. 359/341.33 |
| 6,807,210 | B2 | * | 10/2004 | Iwai et al. ........................ 372/39 |
| 6,928,036 | B2 | * | 8/2005 | Abramovitch et al. .... 369/47.25 |
| 7,408,971 | B2 | * | 8/2008 | Zhang et al. ..................... 372/71 |
| 7,443,900 | B2 | * | 10/2008 | Leyrer et al. .................... 372/53 |
| 7,778,302 | B2 | * | 8/2010 | Ershov et al. ................... 372/57 |
| 7,822,092 | B2 | * | 10/2010 | Ershov et al. ................... 372/55 |
| 7,924,902 | B2 | * | 4/2011 | Kopf et al. ....................... 372/93 |
| 7,933,020 | B1 | * | 4/2011 | Strandjord et al. ........... 356/461 |
| 8,514,898 | B1 | * | 8/2013 | Pang ................................ 372/20 |
| 2005/0169326 | A1 | * | 8/2005 | Jacob et al. ..................... 372/22 |
| 2006/0221434 | A1 | * | 10/2006 | Eno et al. ....................... 359/328 |
| 2010/0027571 | A1 | * | 2/2010 | Murdoch ......................... 372/22 |
| 2010/0150184 | A1 | * | 6/2010 | Kuksenkov ...................... 372/20 |
| 2011/0103408 | A1 | * | 5/2011 | Cho et al. ......................... 372/6 |
| 2012/0230353 | A1 | * | 9/2012 | Xu et al. ............................ 372/6 |

OTHER PUBLICATIONS

"Second-harmonic generation", http://en.wikipedia.org/wiki/Second-harmonic_generation, printed Oct. 1, 2013.*

Alejandro, "Design and characterization of a 5.5-W, cw, injection-locked, fiber-coupled, laser-diode-pumped Nd:YAG miniature-slab laser", Optics Letters / vol. 19, No. 2 / Jan. 15, 1994.*

Schneider, "Generation of strongly squeezed continuous-wave light at 1064 nm", Optical Society of America, Feb. 2, 1998 / vol. 2, No. 3 / Optics Express.*

Pavel, "Nd-vanadate thin-disk lasers under diode pumping into the 4F5/2 and 4F3/2 levels", 2007 Optical Society of America.*

Liu, A Stable 22-W Low-Noise Continuous-Wave Single-Frequency Nd:YVO4 Laser at 1.06 m Directly Pumped by a Laser Diode, vol. 29, No. 5 (2012), Chin. Phys. Lett.*

Masaki, "High-power, efficient, low-noise, continuous-wave all-solid-state Ti:sapphire laser", Optics Letters / vol. 21, No. 23 / Dec. 1, 1996.*

Hodgson et al., "Laser Resonators and Beam Propagation", p. 553, Springer Science+Business Media, Inc., 2005.

Magni et al., "Intracavity frequency doubling of a cw high-power TEM00 Nd:YLF laser", Optics Letters, vol. 18, No. 24, pp. 2111-2113, Dec. 15, 1993.

Oka et al., "Stable intracavity doubling of orthogonal linearly polarized modes in diode-pumped Nd:YAG lasers", Optics Letters, vol. 13, No. 10, pp. 805-807, Oct. 1988.

Tsunekane et al., "High-power, efficient, low-noise, continuous-wave all-solid-state Ti:sapphire laser", Optics Letters, vol. 21, No. 23, pp. 1912-1914, Dec. 1, 1996.

Tsunekane et al., "Elimination of chaos in a multilongitudinal-mode, diode-pumped, 6-W continuous-wave, intracavity-doubled Nd:YAG laser", Optics Letters, vol. 22, No. 13, pp. 1000-1002, Jul. 1, 1997.

Witte et al., "Control and precise measurement of carrier-envelope phase dynamics", Applied Physics B, Lasers and Optics, vol. 78, pp. 5-12, 2004.

* cited by examiner

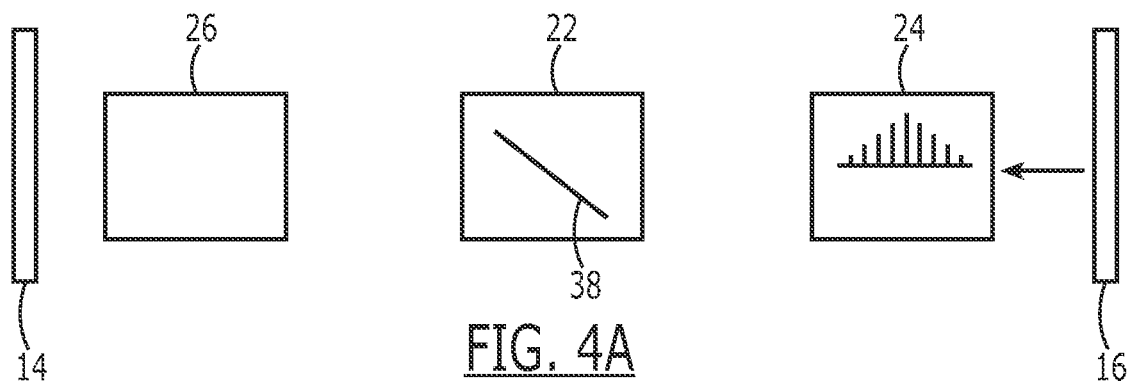
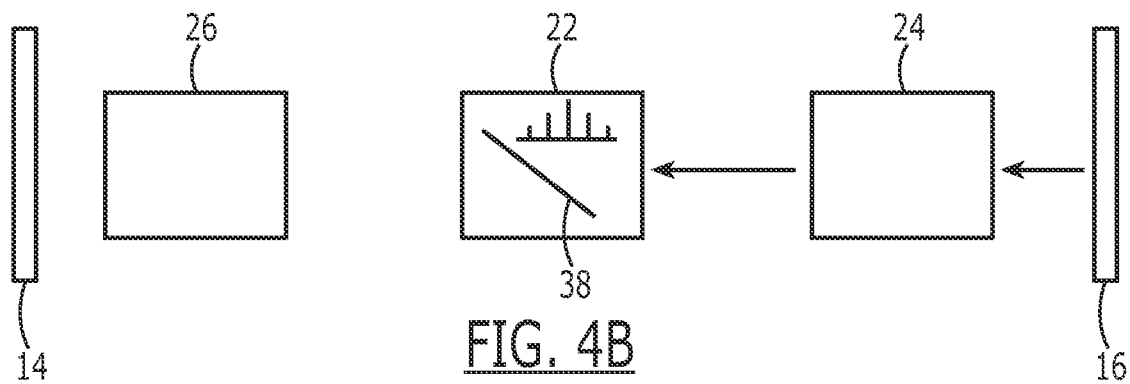
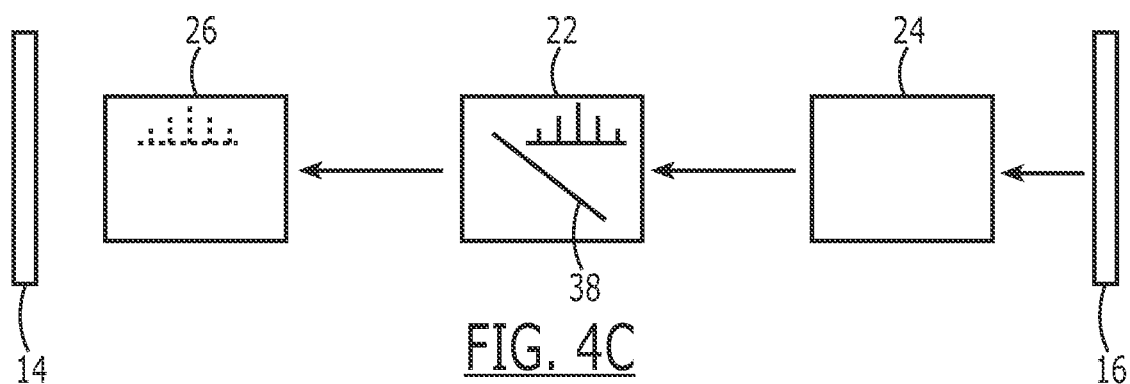

LOW NOISE OPTICALLY PUMPED LASER STRUCTURES UTILIZING DISPERSION ELEMENTS

CROSS-REFERENCE TO RELATED APPLICATIONS

The present disclosure is related to and claims priority from copending provisional U.S. Patent Application Ser. No. 61/589,294, filed on Jan. 20, 2012, which is incorporated herein by reference.

BACKGROUND

The present disclosure relates in general to optically pumped solid-state lasers that deliver laser radiation as a continuous wave or as a sequence of pulses. The disclosure in particular relates to systems and methods for providing low noise radiation of laser light through intracavity sum-frequency generation.

Low noise lasers are essential to progress in cutting edge scientific research such as carrier envelope phase stabilization, high precision optical clocks, and quantum control experiments in physics and chemistry. There are many other fields in which low noise lasers currently, or may in the future, find application.

Optically pumped, standing-wave, solid-state laser resonators are known in the art. Likewise, lasers using intracavity frequency doubling elements are known. A common problem observed with such lasers is significant noise generation in the output laser light, presumably due to interaction between intra-cavity harmonic and sum frequency generation. This chaotic behavior is often referred to as the "green problem"

One approach to addressing the green problem is limiting operation of the laser to single oscillation frequency. One method for producing single frequency operation is use of traveling wave laser cavity designs. However, such designs significantly increase the complexity and hence cost and challenges of manufacturing the lasers. Another approach to limiting operation to a single oscillation frequency is use of wavelength limiting elements in a standing wave oscillator. However, such wavelength limiting elements significantly reduce laser efficiency.

Another known approach to addressing the green problem is encouraging a relatively large number of longitudinal modes (operating wavelengths), such as on the order of 10 or more, and averaging the output to obtain a reduced-noise output beam. However, to generate large number of axial modes a relatively long resonator cavity is required, limiting the compactness of the laser design. The nature of the noise averaging depends on the randomness of the phase relationship of the axial modes. Typically, these types of lasers perform much worse than single frequency laser.

Still other approaches to addressing the green problem, but with a shorter laser resonator and a smaller number of modes, have been demonstrated. However, these approaches all suffer from stability issues, in that a low noise output may be provided for a relatively short period of time, after which the noise level varies significantly with time.

SUMMARY

Accordingly, the present disclosure is directed to systems and methods providing reliable generation of low-noise laser light through intracavity sum-frequency generation in a standing wave, frequency doubled solid-state laser oscillators. In certain embodiments, generation of low-noise green light at or near 532 nm is disclosed.

According to one aspect of the disclosure a optically pumped solid-state laser system comprises: a first reflective element forming a first termination of a resonant beam path; a second reflective element forming a second termination of the resonant beam path; a gain medium element disposed within the resonant beam path between the first reflective element and the second reflective element; a frequency doubling element disposed within the resonant beam path between the first reflective element and the second reflective element; and, a dispersion control element disposed within the resonant beam path between the first reflective element and the second reflective element, the dispersion control element having a surface which is highly reflective to a selected component of light, to separate the selected component of light from a resonant light beam in the resonant beam path and provide the separated component of light as an output. A laser fundamental beam may travel within the resonant beam path, resonate therein and thereby be amplified by the gain medium, be frequency doubled by the frequency doubling element, and be frequency limited by the dispersion control element to form a resonant light beam prior to output by the laser system.

According to another aspect of the disclosure an optically pumped solid-state laser system comprises: a first reflective element forming a first termination of a resonant beam path; a second reflective element forming a second termination of the resonant beam path; a gain medium element disposed within the resonant beam path between the first reflective element and the second reflective element, the gain medium comprising first and second facets for receiving and exiting a light beam in the resonant beam path, each first and second facet disposed in a plane, and wherein the plane of the first facet is inclined relative to the plane of the second facet to thereby form a dispersive gain medium with integral dispersion element; a frequency doubling element disposed within the resonant beam path between the first reflective element and the second reflective element; and wherein a source beam may enter the resonant beam path, resonate therein and thereby be frequency doubled by the frequency doubling element and be amplified and frequency limited by the dispersive gain medium, to form a resonant light beam prior to output by the laser system.

Implementations of these aspects may also include the dispersion control element being formed as a prism, a pyramid, a rod, a, birefringent filter (known as Lyot filter), an etalon, etc. disposed in the resonant beam path, to limit the oscillation axial modes to a desired value, such as 5-7 modes, an in one example 5 modes, to enable intracavity second harmonic generation back conversion, which in turn enables elimination of second harmonic generation (SHG) and domination of intracavity sum frequency generation and phase locking.

The above is a brief summary of a number of unique aspects, features, and advantages of the present disclosure. The above summary is provided to introduce the context and certain concepts relevant to the full description that follows. However, this summary is not exhaustive. The above summary is not intended to be nor should it be read as an exclusive identification of aspects, features, or advantages of the claimed subject matter. Therefore, the above summary should not be read as imparting limitations to the claims nor in any other way determining the scope of said claims.

BRIEF DESCRIPTION OF THE DRAWINGS

In the drawings appended hereto like reference numerals denote like elements between the various drawings. While illustrative, the drawings are not drawn to scale.

FIGS. 4A through 4F are illustrations of the state of the resonating beam and output beam through various elements of a diode-pumped solid-state laser system in accordance with one embodiment of the present disclosure.

DETAILED DESCRIPTION

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

Figure 1:
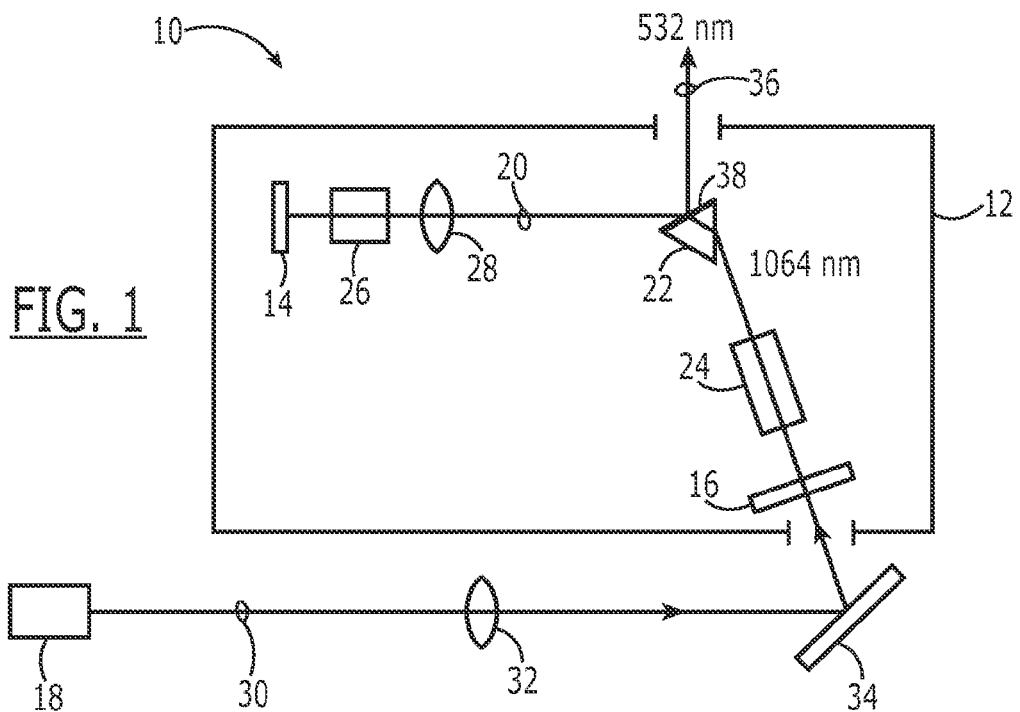
FIG. 1 is a schematic illustration of a diode-pumped solid-state laser system in accordance with one embodiment of the present disclosure.

With reference now to FIG. 1, there is shown therein a diode-pumped solid-state laser system 10 in accordance with one embodiment of the present disclosure. System 10 comprises a laser resonator 12 comprising a first reflective element 14 and a second reflective element 16. First reflective element is highly reflective of light in the wavelengths of interest, such as around 532 nanometers (nm) and 1064 nm. Second reflective element 16 may be transmissive to a source beam at, for example 808 nm, and highly reflective to a resonating beam in the wavelengths of interest, for example 1064 nm, so as to create a resonating beam path 20 with first reflective element 14.

A dispersion control element 22 is disposed in resonating beam path 20 between a solid state gain medium 24 and a frequency doubling crystal 26. Focusing lens 28 is also disposed in resonating beam path 20, serving to bring the proper laser power density to frequency doubling crystal 26 for conversion efficiency. Solid state gain medium 24 may comprise a rare earth doped crystal (as opposed to semiconductor gain structures), for example, Nd:YAG, Nd:YVO$_4$, Yb:YAG, Yb:YVO$_4$, etc. In one embodiment, the gain medium provides an upper state lifetime greater than 1 ns. Frequency doubling crystal 26 may, for example, comprise LBO, KTP, etc.

In operation, laser source 18, which may for example be a fiber coupled diode laser (emitting at a wavelength of 808 or 880 nm for the example of gain medium being Nd:YVO$_4$), produces a source beam 30, which is focused by focusing lens 32 to highly reflective mirror structure 34. Use of mirror structure 34 provides a folded pump beam path to make the laser more compact.

In the present embodiment, dispersion control element 22 comprises a prism. Other dispersion control elements are also contemplated herein, such as a pyramid, grating, rod, etalon, birefringent element (Lyot filter), etc. Element 22 may be coated with a harmonic separating thin film coating 38, that is highly transmissive at the fundamental lasing wavelength of 1064 nm but highly reflective at the second harmonic of the lasing wavelength, 532 nm. In this way, dispersion control element 22 permits fundamental mode energy at 1064 nm to resonate in the resonating beam path, while reflecting and ultimately emitting a beam 36 of the desired output laser energy at 532 nm to exit the laser resonator 12.

Proper cooling of the gain medium and temperature control of the nonlinear crystal are also implemented to ensure the laser performance.

Figure 2:
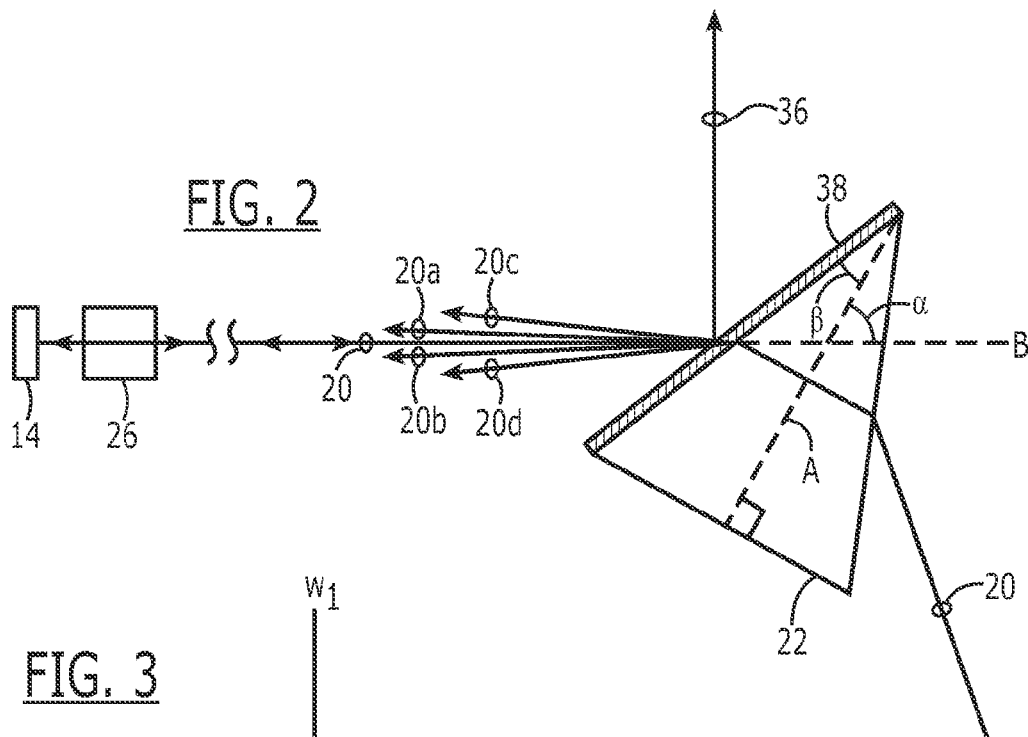
FIG. 2 is an illustration of a dispersion control element for use in a diode-pumped solid-state laser system in accordance with one embodiment of the present disclosure.

With reference to FIG. 2, we provide a detailed view and discussion of dispersion control element 22. In the embodiment of FIG. 1, dispersion control element 22 is a prism. As an alternative to prisms, in various embodiment dispersion control elements may take the form of pyramids, gratings, rods, and other discrete or composite elements, including embodiments discussed further below capable of dispersing incident light into constituent elements. As is well known, a prism resolves incoming light into its constituent wavelengths due to wavelength-based refraction, and will therefore be used as an example for illustrating the concepts disclosed herein. Prismatic dispersion is used to resolve the beam in resonating beam path 20 into a plurality of single-wavelength paths 20, 20$a$, 20$b$, 20$c$, 20$d$, etc. Snell's law permits the calculation of angle $\alpha$, which represents the orientation of the primary axis A (or alternatively the facet angle $\beta$) with respect to the desired beam path B. This in turn permits placement, in terms of path length and relative angles, of mirror 14 such that only the desired wavelength is reflected back towards prism 22 along beam path 20. While an optional stop may be employed, the present disclosure provides a structure and method obviating the need for such a stop. That is, dispersion is used to control the number of modes operating in resonating beam path 20.

Figure 3:
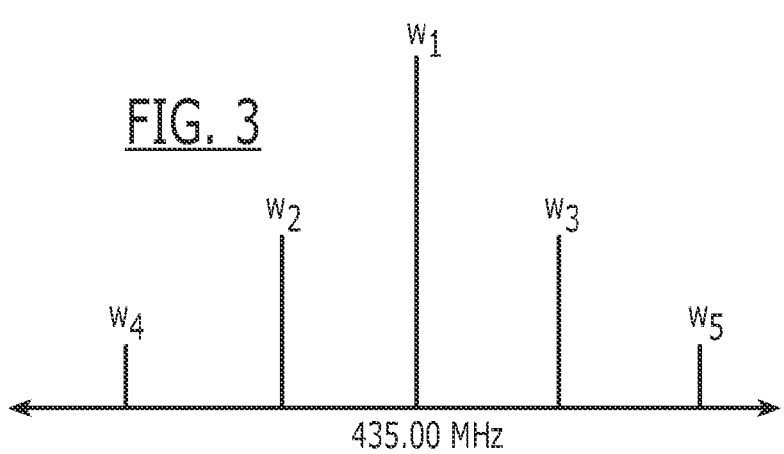
FIG. 3 is a plot of frequency versus magnitude for a laser beam of a type that may resonate within a diode-pumped solid-state laser system in accordance with one embodiment of the present disclosure.

With reference to FIG. 3, the wavelength distribution of a sample resonating beam along beam path 20 is shown. As will be understood by one skilled in the art, the beam is comprised of oscillating axial modes. The fundamental wavelength or axial mode is represented by $\omega_1$, $\omega_2$, $\omega_3$, $\omega_4$, and $\omega_5$, etc.

Figure 4D:
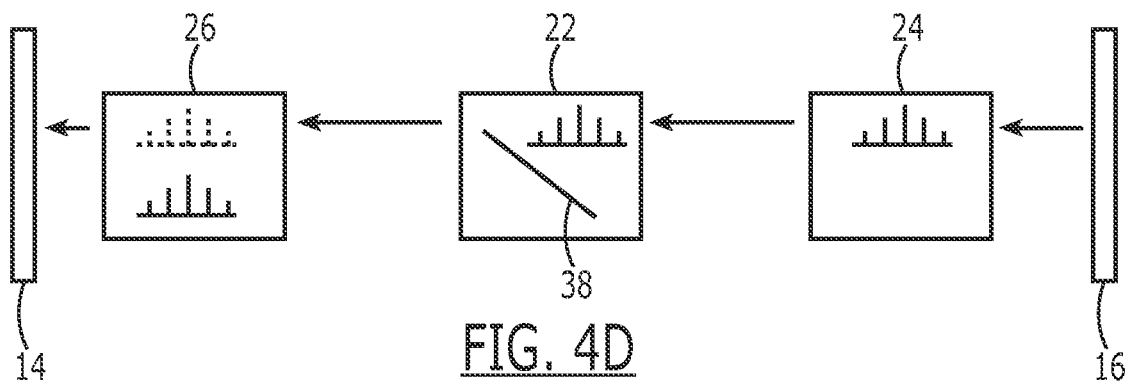

FIGS. 4A-4F are schematic illustrations of certain of the elements comprising the embodiment of FIG. 1, presented for a discussion of the operation of that embodiment and others described herein. In general, operation proceeds with reference to the figures in order, in which in:

FIG. 4A, lasing begins when the pump source (element 18, FIG. 1) drives oscillation above the threshold power for the device, the pump beam (element 30, FIG. 1) itself comprising a wavelength packet that is absorbed by the gain medium, 24;

FIG. 4B, dispersion control element 22 limits the composition of the beam in resonating beam path 20 to 5 modes;

FIG. 4C, doubling crystal 26 generates second harmonics from the beam in resonating beam path 20;

FIG. 4D, due to the concentration of energy within the limited number of modes in the second harmonic and proper phase match condition, back conversion occurs that converts the second harmonic light back into the fundamental infrared wavelength that is in oscillation.

Figure 4E:
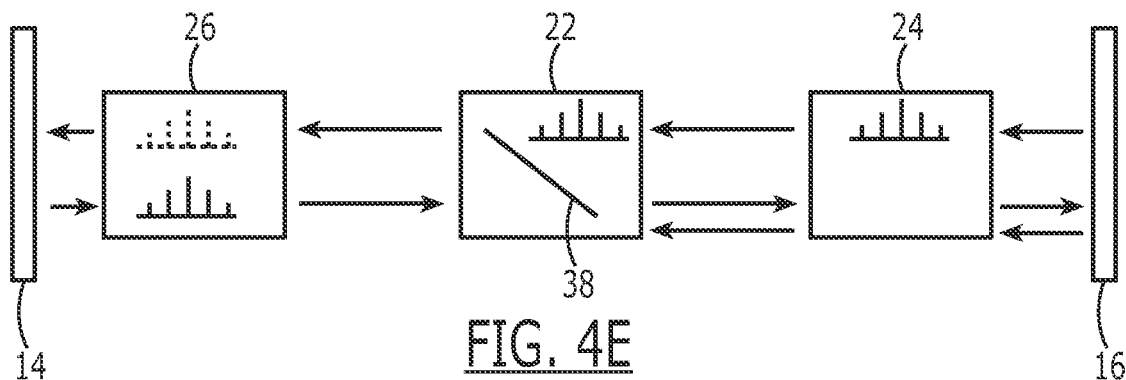
Figure 4F:
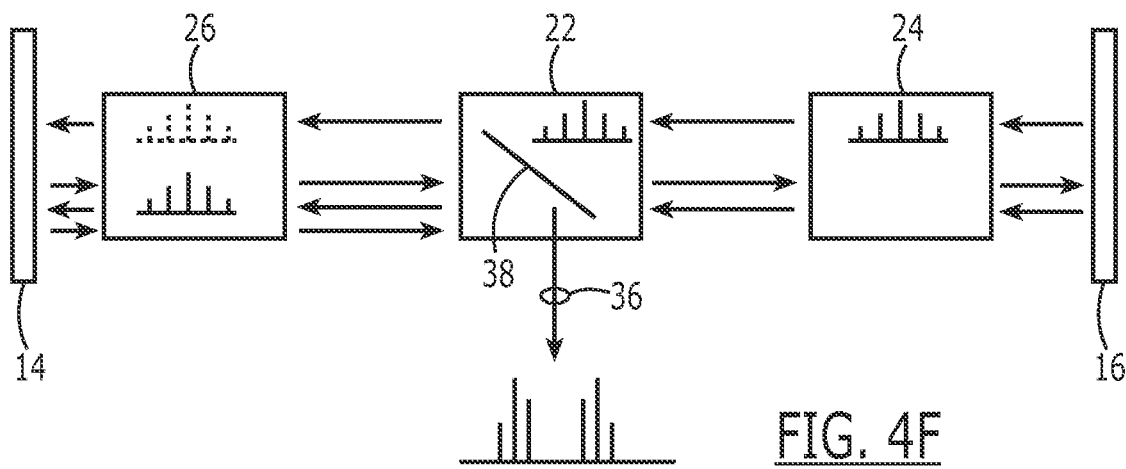

FIG. 4E, upon reflection by reflective element 14 back into doubling crystal 26, certain portion of the back converted light that carries the same phase starts seeding the fundamental oscillating beam and synchronizing with the phase of the wave traveling toward the gain medium and the reflective element 16; the beam in beam resonating beam path 20 returns through gain medium 24, is reflected by reflective element 16, passes again through gain medium 24, thereby amplifying the phase-synchronized beam (photons); and FIG. 4F, the phase synchronized fundamental oscillating beam then starts the generation of sum-frequency of doubled light and suppression (cancellation) of the second harmonic frequencies in the doubling crystal, ultimately resulting in phase-locked, steady-state output at the desired low noise wavelength of 532 nm. The mode spacing of the 532 nm light that is exactly the same as the fundamental IR mode spacing, as well as the diminishing of the center mode in the laser output spectrum shows sum-frequency generation with elimination of the second harmonic generation.

Figure 5A:
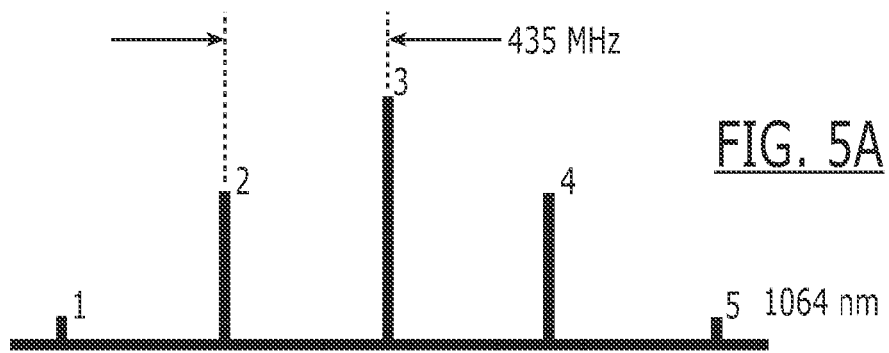
FIGS. 5A through 5D are further illustrations of the resonating beam and output beam axial mode structure through various stages in a diode-pumped solid-state laser system to reach steady state operation in accordance with one embodiment of the present disclosure.
Figure 5B:
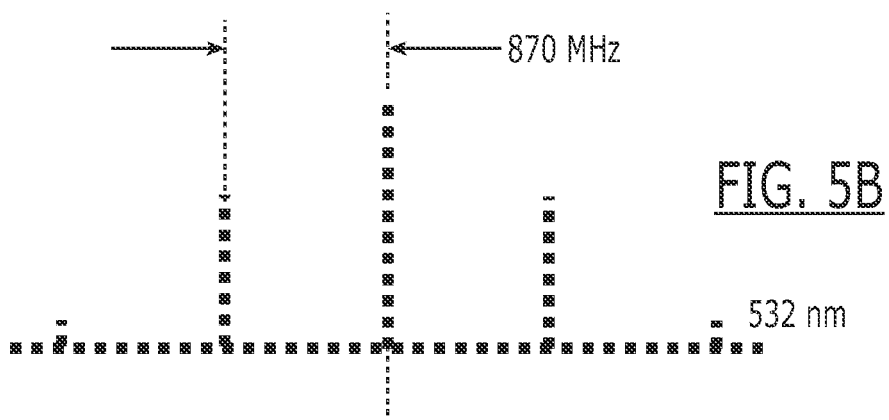
Figure 5C:
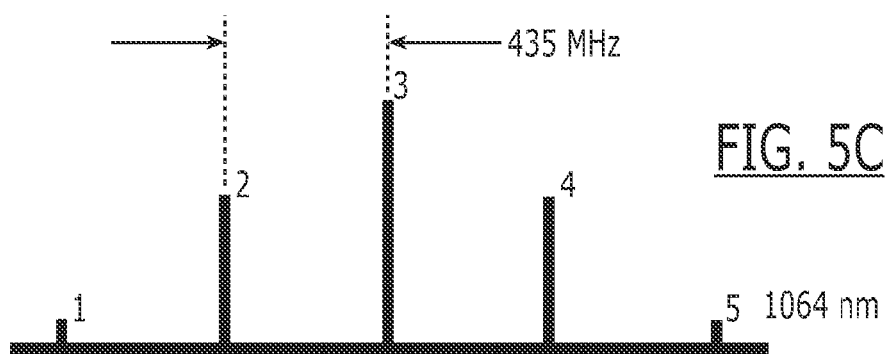
Figure 5D:
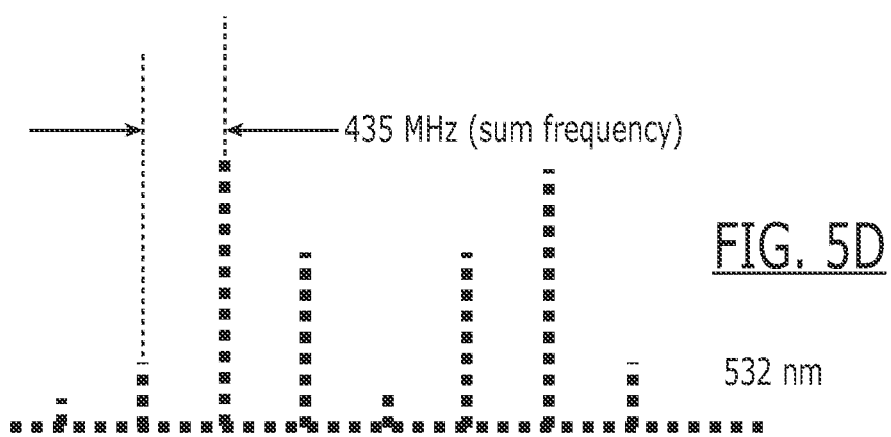

With reference to FIGS. 5A-5D, generation of the desired output light energy is illustrated. Light at a fundamental wavelength ω oscillates in the resonator. As shown in the example of FIG. 5A, the wavelength is 1064 nm, the axial mode spacing 435 MHz. While certain prior art systems and methods seek to increase the number of harmonics for the purpose of noise averaging, according to the present disclosure five modes are present, as illustrated in FIG. 5A. The laser oscillates at 1064 nm, with mode spacing of 435 MHz. The second harmonic generated is at 2ω, shown in FIG. 5B. In the example shown, the wavelength for the second harmonic is 532 nm, the axial mode spacing 870 MHz. The second harmonic back conversion into laser oscillation is at 1064 nm, with mode spacing of 435 MHz, as shown in FIG. 5C. The sum-frequency generation from back-conversion is between the oscillating axial modes. In the example shown in FIG. 5D, the wavelength is 532 nm, the axial mode spacing becomes 435 MHz.

Figure 11:
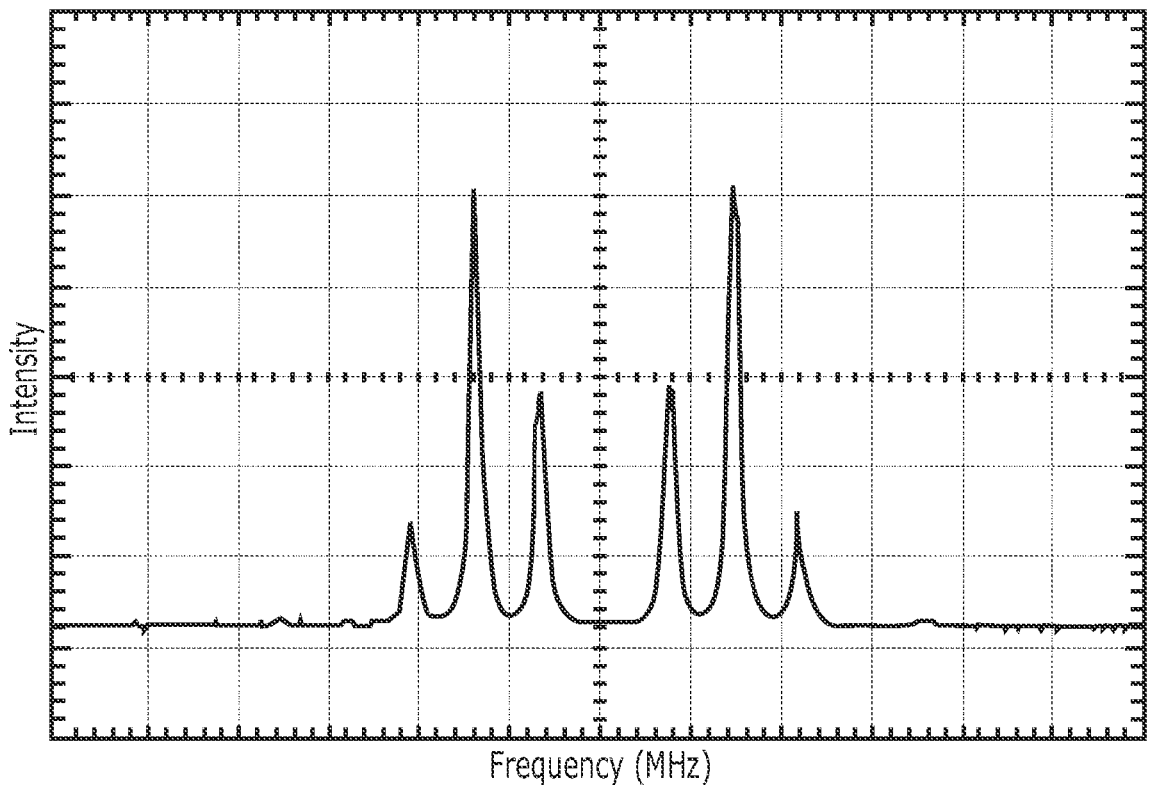
FIG. 11 is a screen-capture of the output spectrum of an optically pumped solid-state laser structure according to the embodiment illustrated in FIG. 1, highlighting the suppression of the middle mode and hence elimination of second harmonic generation.

The elimination of second harmonic generation is evident as shown in FIG. 11. FIG. 11 is a screen-capture of the output spectrum of an optically pumped solid-state laser structure according to the embodiment illustrated in FIG. 1, measured from the laser output beam with a scanning Fabry-Perot interferometer. The absence of the middle mode in the 532 nm light represents the energy transfer out in the back conversion process into the dominant sum-frequency generation, resulting in mode phase lock.

Figure 6A:
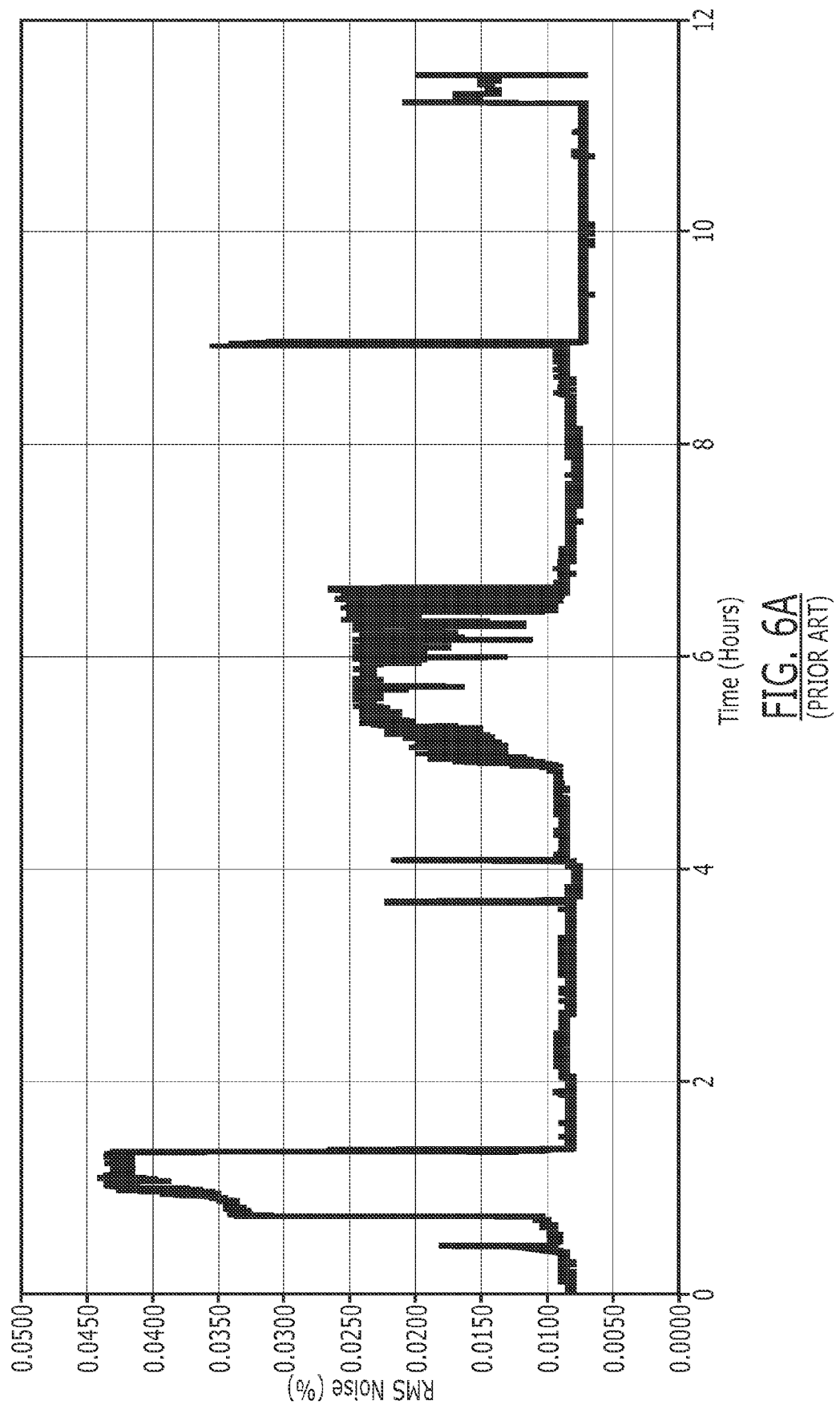
FIGS. 6A and 6B are plots of RMS noise (in percent) versus time for a prior art diode-pumped solid-state laser and a diode-pumped solid-state laser system in accordance with one embodiment of the present disclosure, respectively.
Figure 6B:
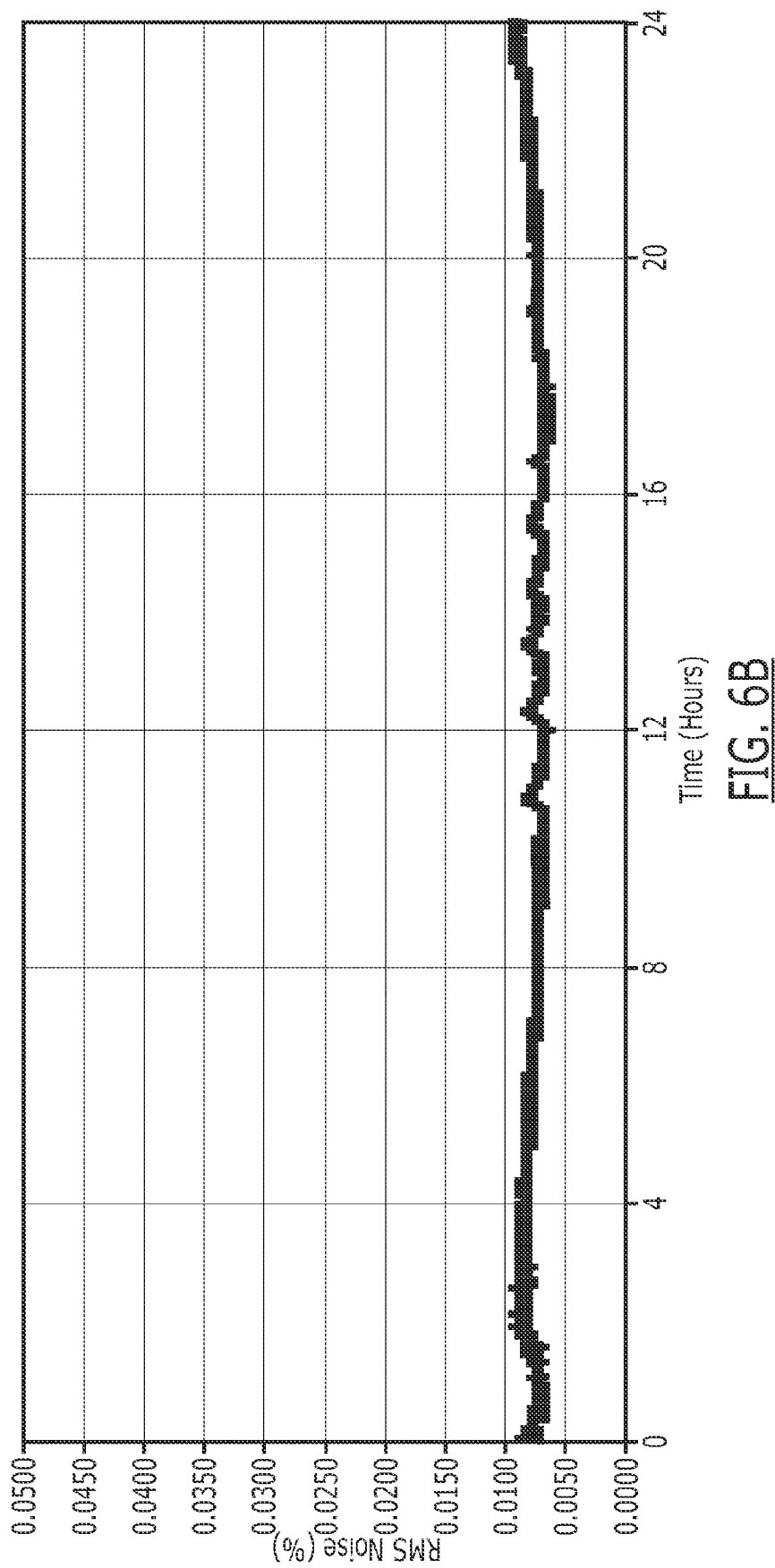

In operation, the output of laser system 10 is not only low noise, the noise that is present in the output is relatively stable over time while the laser is in use. With reference to FIG. 6A, a plot of RMS noise as a percentage of output signal over a 12 hour period of continuous operation is shown for a prior art multi-mode solid-state optically pumped laser. As can be seen, this representative device begins to produce a relatively high-noise output after a reasonably short period of operation. The noise fluctuates with time. However, with reference to FIG. 6B, it can be seen that the relatively low initial noise present in the output beam remains virtually constant throughout not only 12 hours of continuous operation but 24 hours of continuous operation. It can therefore be concluded that the device composition and arrangement disclosed herein overcomes the green problem, particularly in comparison to prior art efforts.

While the above represents one mode of operation for the embodiment illustrated in FIG. 1, other modes of operation are possible and within the scope of the present disclosure. Any mode of operation described herein is provided by way of example, and no such described mode of operation shall be considered a limitation on the scope of the structures disclosed and claimed here.

Figure 7A:
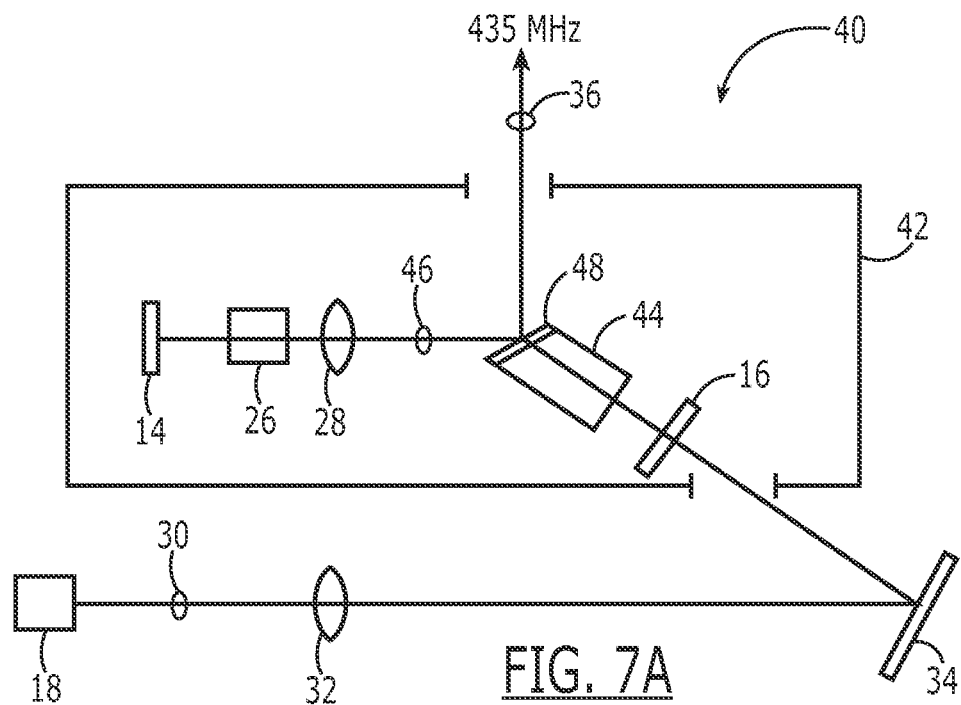
FIGS. 7A and B are schematic illustrations of a diode-pumped solid-state laser system in accordance with an alternate embodiment of the present disclosure, and a variation thereof, respectively.

With reference next to FIG. 7A, there is shown therein a diode-pumped solid-state laser system 40 in accordance with another embodiment of the present disclosure. System 40 comprises a laser resonator 42 comprising a dispersive solid-state gain medium 44 and a frequency doubling crystal 26 placed in resonating beam path 46. Beam path 46 terminates at a maximum reflecting mirror 14 for light at both the lasing fundamental wavelength (e.g., 1064 nm) and the frequency doubled wavelength (e.g., 532 nm). Focusing lens 28 serves to bring the proper laser power density to the frequency doubling crystal 26 within resonator 42 to achieve the desired conversion efficiency. A suitable laser source 18, for example a fiber coupled diode laser delivering at a wavelength of 808 or 880 nm for the example of gain medium being Nd:YVO$_4$, through a focusing lens module 32 is disposed for introducing a pump light beam 30 through end mirror 16, as previously discussed. A highly reflective mirror 34 for the pump laser wavelength is disposed to fold the pump beam to make the laser 40 more compact.

In one example, gain medium 44 may comprise Nd:YAG, Nd:YVO$_4$, Yb:YAG, Yb:YVO$_4$, etc. Gain medium 44 is formed to have end facets in non-parallel planes. That is, each facet through which the resonating light beam passes is planar, and the plane of one facet is inclined with respect to the plane of the other facet. A wide variety of different angles are possible to provide the dispersion function. In one example, the plane of the first facet is inclined from parallel with respect to the plane of the second facet by greater than one degree, and in additional examples between 4 degrees and the Brewster angle relative to the resonant beam path. This provides a gain medium that also functions as a dispersion control mechanism, for example in a manner similar to the prism gain medium 38 of FIG. 1. Accordingly, in the present embodiment gain medium 44 serves the dual functions of providing optical gain and dispersion control, and a separate dispersion control mechanism is not required. One end facet of gain medium 44 may be coated with a harmonic separating thin film coating 48, which is transmissive at the fundamental lasing wavelength (e.g., 1064 nm) but is highly reflective at the second harmonic of the lasing wavelength (e.g., 532 nm), allowing the desired output laser energy 36 to exit the laser resonator 42.

Figure 7B:
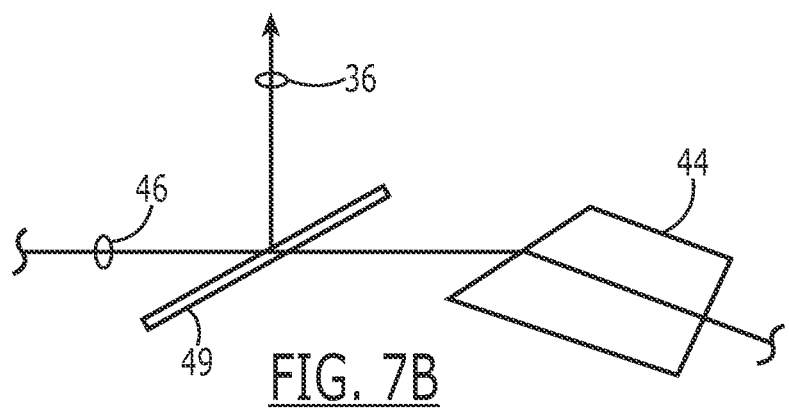

It will be appreciated that variations of the embodiment described above will be apparent to those skilled in the art, and that the arrangement of elements of this embodiment is for illustration. For example, as shown in FIG. 7B, in place of harmonic separating thin film coating 48, a separate element 49 may be introduced into resonating beam path 46 that is transmissive at the fundamental lasing wavelength (e.g., 1064 nm) but is highly reflective at the second harmonic of the lasing wavelength (e.g., 532 nm), allowing the desired output laser energy 36 to exit the laser resonator 42.

Figure 8:
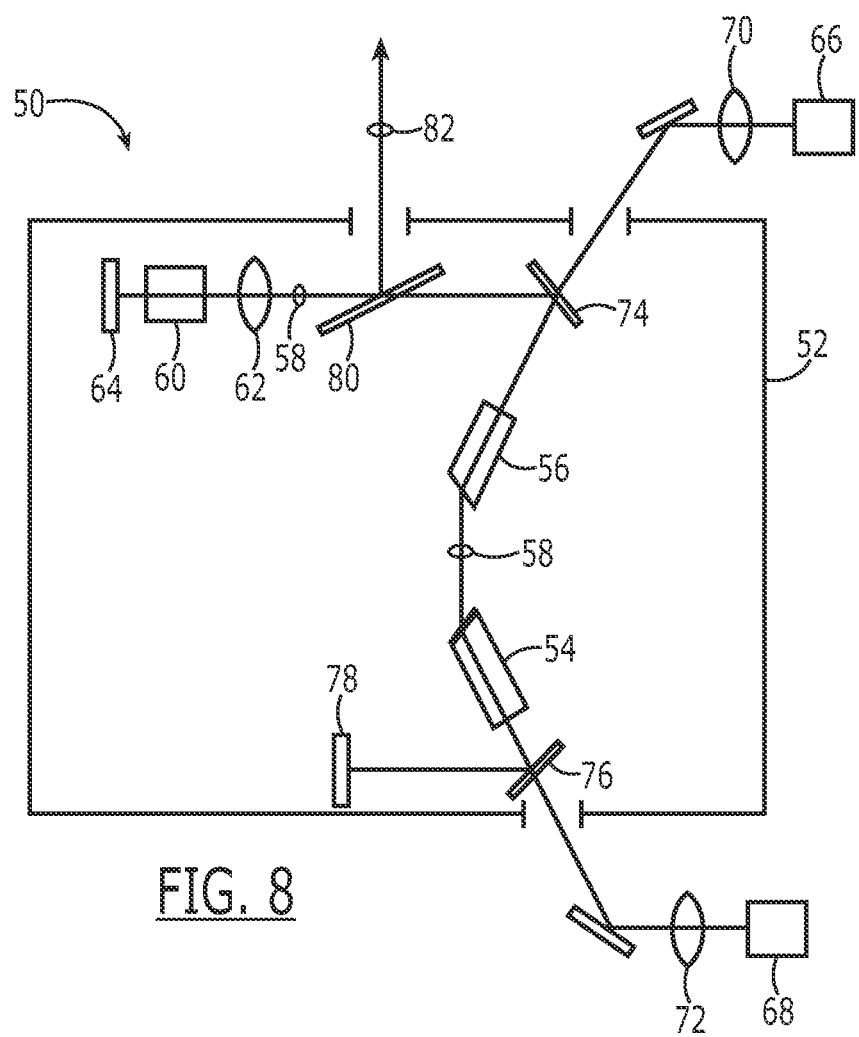
FIG. 8 is a schematic illustration of a diode-pumped solid-state laser system in accordance with a further alternate embodiment of the present disclosure.

Another embodiment of the present disclosure is illustrated in FIG. 8. The laser system 50 illustrated in FIG. 8 comprises resonator 52, in which is disposed first dispersive solid-state gain medium 54 and second dispersive solid-state gain medium 56, each in resonating beam path 58. Each of gain medium 54 and gain medium 56 may comprise Nd:YAG, Nd:YVO₄, Yb:YAG, Yb:YVO₄, etc. As previously disclosed, each of gain medium 54 and gain medium 56 are formed to have end facets in non-parallel planes. They therefore function as both gain media and dispersion control mechanisms. While both of gain media 54, 56 are shown as having end facets in non-parallel planes, and no separate dispersion control mechanism is shown, in alternate embodiments either gain medium 54 or 56 may have parallel end facets, and a separate dispersion mechanism (not shown) associated therewith and disposed in beam path 58. Gain media 54, 56 are arranged relative to one another such that a beam in beam path 58 exits one and enters the other regardless of the direction of that beam (the beam resonates through each, as discussed further below).

Also disposed within resonator 52 is frequency doubling crystal 60, focusing lens 62, and maximum reflecting mirror 64, each placed in resonating beam path 58. Focusing lens 62 serves to bring the proper laser power density to the frequency doubling crystal 60 to achieve the desired conversion efficiency.

Laser system 50 illustrated in FIG. 8 may be pumped by dual laser light sources 66, 68 (although in alternate embodiments only a single source may be employed). Each source 66, 68 may be a fiber coupled diode laser delivering at a wavelength of 808 or 880 nm for the example of gain medium being Nd:YVO₄ (as one example). Lens modules 70, 72 focus the light from sources 66, 68, respectively, to high-transmissive elements 74, 76, respectively. Elements 74, 76 are wavelength-dependent reflective elements that permit light from sources 66, 68 to pass through, but are highly reflective of light in the fundamental laser wavelength. The pump light excites the gain media 56 and 54. In one direction, the generated photons travel though gain medium 56, through gain medium 54, are reflected by mirror 76 to an end mirror 78, where the beam returns along beam path 58, is reflected by element 76, travels though gain medium 54, through gain medium 56, is reflected by mirror 74, through output mirror 80, to lens 62, through doubling crystal 60, and reflected by mirror 64 back along beam path 58 once again, and so on such that the laser oscillation begins. Output mirror 80 is selectively transmissive of certain wavelengths and reflective of other wavelengths. In one example, output mirror 80 is transmissive at the fundamental lasing wavelength (e.g., 1064 nm) but is highly reflective at the doubled light of the lasing wavelength (e.g., 532 nm), allowing the desired output laser energy 82 to exit the laser resonator 52. Optical gain, frequency doubling, and dispersion control are essentially as described above.

Figure 9:
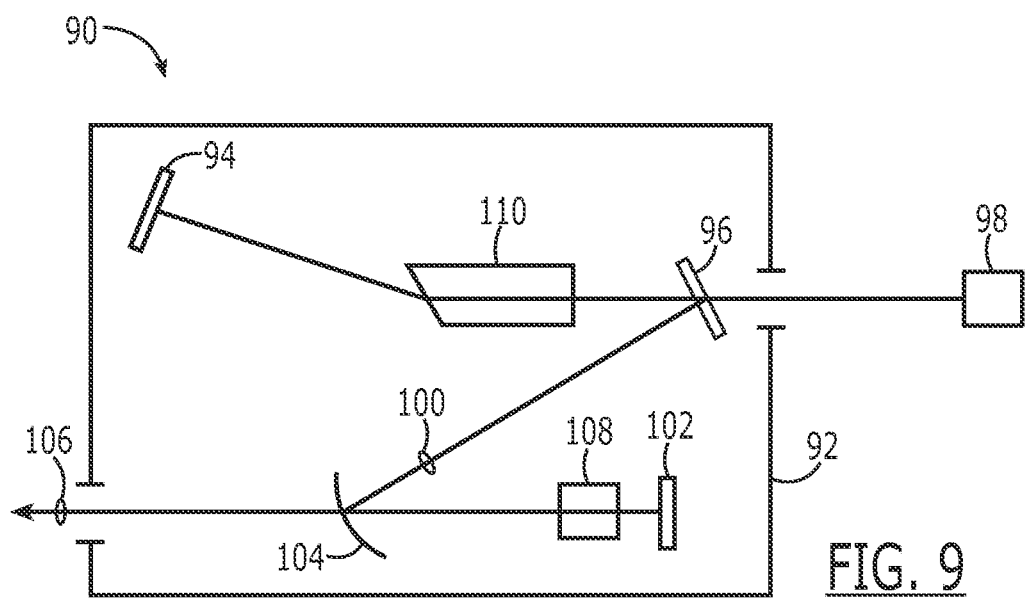
FIG. 9 is a schematic illustration of a diode-pumped solid-state laser system in accordance with another alternate embodiment of the present disclosure.

With reference to FIG. 9, another embodiment of the present disclosure is illustrated. In FIG. 9, a folded-optics laser system 90 comprises a resonator 92 including a first reflective element 94 and a second reflective element 96. First reflective element 94 is highly reflective of light in the wavelengths of interest, such as around 1064 nm. Second reflective element 96 may be transmissive at wavelengths of a source beam generated by an external source 98, and highly reflective at the resonant wavelengths, so as to create a portion of a resonating beam path 100. First reflective element 94 forms a first termination of resonating beam path 100, and a third reflective element 102 may form the second termination of resonating beam path 100. A fourth reflective element 104, in this example a concave mirror, may be reflective at the fundamental resonator wavelength (e.g., 1064 nm), and transmissive at the second harmonic wavelength (e.g., 532 nm) to produce a desired light output 106. The focusing of the beam in beam path 100 may be achieved by fourth reflective element 104. A doubling crystal 108, of a type discussed above, may be disposed in beam path 100, such as between third reflecting element 102 (which is highly reflective of light in the wavelengths of interest, such as around 532 nanometers (nm) and 1064 nm) and fourth reflecting element 104.

Gain medium 110 is disposed in beam path 100, such as between first reflective element 94 and second reflective element 96. Gain medium 110 may comprise Nd:YAG, Nd:YVO₄, Yb:YAG, Yb:YVO₄, etc. Gain medium 110 is formed to have end facets in non-parallel planes. As previously discussed, this provides a gain medium that also functions as a dispersion control mechanism. Optical gain, frequency doubling, and dispersion control are essentially as described above.

It is noteworthy with regard to the embodiment shown in FIG. 9 that doubling crystal 108 is disposed opposite the dispersion control surface of dispersive gain medium 110 in the resonant beam path 100. While prior embodiments have shown the doubling crystal disposed between the dispersive element and a reflective termination of the beam path, the embodiment illustrated in FIG. 9 serves to demonstrate that such is not a requirement for all embodiments disclosed herein. In general, the embodiments disclosed illustrate general constitutions and operations, which may be rearranged without departing from the spirit and scope of the overall disclosure herein.

Figure 10:
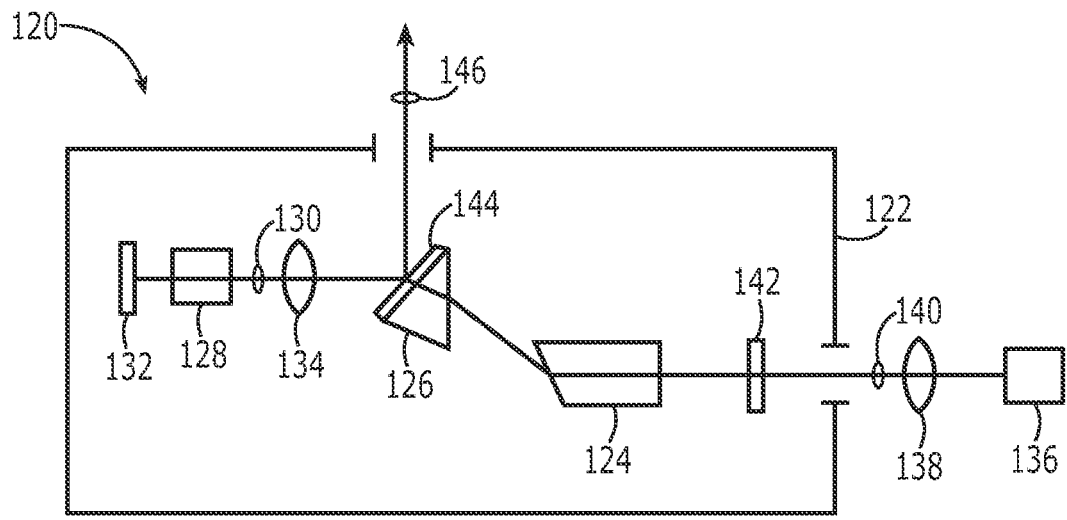
FIG. 10 is a schematic illustration of a diode-pumped solid-state laser system in accordance with yet another alternate embodiment of the present disclosure.

Furthermore, in the examples described above, the gain medium has either been separate from the dispersion element, in which case both are present, or integrated with the dispersion element, in which case only a single combined gain medium-dispersion element is provided. However, in certain embodiments, such as that of FIG. 10, both a combined gain medium-dispersion element and a separate dispersion control element may be employed. While many different arrangements of these elements are possible and contemplated herein, according to one example of a laser system 120, shown in FIG. 10, a resonator 122 comprises a dispersive solid-state gain medium 124 with non-parallel end facets as well as a dispersion control element 126 (e.g., a prism). A frequency doubling crystal 128 is disposed in resonating beam path 130, which terminates at reflective element 132. Focusing lens 134 serves to bring the proper laser power density to the frequency doubling crystal 128 within resonator 122 to achieve the desired conversion efficiency. A suitable laser source 136, for example a fiber coupled diode laser delivering at a wavelength of 808 or 880 nm for the example of gain medium being Nd:YVO₄, through a focusing lens 138 is disposed for introducing a pump light beam 140 through end mirror 142, as previously discussed. Optical gain, frequency doubling, dispersion control, and harmonic back-conversion are essentially as described above. Harmonic separating film 144, that is highly transmissive at the fundamental lasing wavelength of 1064 nm but highly reflective at the doubled lasing wavelength, 532 nm, is disposed on one facet of dispersion control element 126. Harmonic separating film 144 permits fundamental mode energy at 1064 nm to resonate in the resonating beam path, while reflecting and ultimately emitting a beam 146 of the desired output laser energy at 532 nm at the exit of laser resonator 122.

The examples described, and hence the scope of the claims below, encompass examples of various arrangements of hardware and methods for use thereof. Both the hardware and methods of use have been described together, although the hardware described may be employed for use in methods different than those described, and likewise, the methods may be employed for use in hardware different than that described in association therewith.

The physics of modern electrical devices and the methods of their production are not absolutes, but rather statistical efforts to produce a desired device and/or result. Even with the utmost of attention being paid to repeatability of processes, the cleanliness and accuracy of manufacturing facilities and methods, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. An optically pumped solid-state laser system, comprising:
   a first reflective element forming a first termination of a resonant beam path;
   a second reflective element forming a second termination of said resonant beam path;
   a gain medium element disposed within said resonant beam path between said first reflective element and said second reflective element;
   a frequency doubling element disposed within said resonant beam path between said first reflective element and said second reflective element; and
   a dispersion control element disposed within said resonant beam path between said first reflective element and said second reflective element, said dispersion control element having a surface which is highly reflective to a selected component of light, to separate said selected component of light from a resonant light beam in said resonant beam path and provide said separated component of light as an output of said laser system;
   wherein a source beam may enter said gain medium element to generate a light output in said resonant beam path, said light output may be frequency doubled by said frequency doubling element, and be frequency limited by said dispersion control element to form said resonant light beam prior to output by said laser system.

2. The optically pumped solid-state laser system of claim 1, wherein said dispersion control element is selected from the group consisting of: a prism, a pyramid, an etalon, and a birefringent filter.

3. The optically pumped solid-state laser system of claim 1, wherein said dispersion control element is configured to limit said resonant light beam to a packet of frequencies comprising 5-7 modes.

4. The optically pumped solid-state laser system of claim 1, wherein said system is configured for phase-locked resonance of said resonant light beam, and further wherein said system is configured to output a light beam substantially without a second harmonic thereof.

5. The optically pumped solid-state laser system of claim 1, wherein said surface comprises a harmonic separating film, said harmonic separating film transmissive of light of a fundamental wavelength, and reflective of light of a second harmonic of said fundamental wavelength, whereby said light of said fundamental wavelength forms said resonant light beam and is permitted to resonate in said resonant beam path and said light of said second harmonic is reflected as said output of said laser system.

6. The optically pumped solid-state laser system of claim 5, wherein said harmonic separating film is composed and configured to permit light substantially at 1064 nm to pass therethrough, and to reflect light substantially at 532 nm incident thereon.

7. The optically pumped solid-state laser system of claim 1, further comprising an optical pump disposed to direct a source beam into said gain medium, for energizing said gain medium and supporting resonance of said resonant light beam along said resonant beam path.

8. The optically pumped solid-state laser system of claim 7, wherein said gain medium element comprises Nd:YVO$_4$, and said optical pump is configured to produce said source beam substantially between 808 and 880 nm.

9. The optically pumped solid-state laser system of claim 1, wherein said gain medium comprises first and second facets for receiving and exiting a beam in said resonant beam path, each said first and second facets disposed in a plane, and wherein said plane of said first facet is inclined relative to said plane of said second facet to thereby form a dispersive gain medium with integral dispersion element.

10. The optically pumped solid-state laser of claim 9, wherein said plane of said first facet is inclined from parallel with respect to said plane of said second facet by between 4 degrees and the Brewster angle relative to said resonant beam path.

11. The optically pumped solid-state laser system of claim 9, further comprising a supplemental dispersion control element formed and disposed separately from said dispersive gain medium.

12. The optically pumped solid-state laser system of claim 11, wherein said supplemental dispersion control element is a prism.

13. The optically pumped solid-state laser system of claim 9, further comprising a supplemental gain medium, disposed in said resonant beam path, comprising first and second facets for receiving and exiting said resonant light beam in said resonant beam path, each said first and second facets of said supplemental gain medium disposed in a plane, and wherein said plane of said first facet of said supplemental gain medium is inclined relative to said plane of said second facet of said supplemental gain medium to thereby form a supplemental dispersive gain medium with integral dispersion element.

14. The optically pumped solid-state laser system of claim 13, wherein said dispersive gain medium and said supplemental dispersive gain medium are oriented relative to one another in said resonant beam path such that said first facet of said dispersive gain medium is adjacent to said first facet of said supplemental dispersive gain medium.

15. The optically pumped solid-state laser system of claim 13, further comprising an optical pump disposed to direct a source beam into said dispersive gain medium, for energizing said gain medium and supporting resonance of said resonant light beam along said resonant beam path.

16. The optically pumped solid-state laser system of claim 15, further comprising a supplemental optical pump disposed to direct a supplemental source beam into said supplemental dispersive gain medium, for energizing said supplemental dispersive gain medium and, together with said source beam, supporting resonance of said resonant light beam along said resonant beam path.

17. The optically pumped solid-state laser system of claim 16, wherein said optical pump and said supplemental optical pump are each configured to produce light substantially at 808 nanometers.

18. An optically pumped solid-state laser system, comprising:
- a first reflective element forming a first termination of a resonant beam path;
- a second reflective element forming a second termination of said resonant beam path;
- a gain medium element disposed within said resonant beam path between said first reflective element and said second reflective element, said gain medium element comprising first and second facets for receiving and exiting a light beam in said resonant beam path, each said first and second facets disposed in a plane, and wherein said plane of said first facet is inclined relative to said plane of said second facet to thereby form a dispersive gain medium with integral dispersion element;
- a frequency doubling element disposed within said resonant beam path between said first reflective element and said second reflective element; and
- wherein a source beam may enter said gain medium element to generate a light output in said resonant beam path, said light output may be frequency doubled by said frequency doubling element, and be amplified and frequency limited by said dispersive gain medium, to form a resonant light beam prior to output by said laser system, and the resonant beam path operates in a multi-longitudinal mode of operation.

19. The optically pumped solid-state laser system of claim 18, wherein said first facet is provided with a harmonic separation layer that is highly reflective to a selected component of light, to separate said selected component of light from said resonant light beam in said resonant beam path and provide said separated component of light as an output of said laser system.

20. An optically pumped solid-state laser system, comprising:
- a first reflective element forming a first termination of a resonant beam path;
- a second reflective element forming a second termination of said resonant beam path;
- a gain medium element disposed within said resonant beam path between said first reflective element and said second reflective element;
- a frequency doubling element disposed within said resonant beam path between said first reflective element and said second reflective element;
- a prism disposed within said resonant beam path between said first reflective element and said second reflective element, said prism having disposed on a surface thereof a harmonic separating film, said harmonic separating film transmissive of light of a fundamental wavelength substantially at 1064 nm, and reflective of light of a second harmonic of said fundamental wavelength substantially at 532 nm; and
- an optical pump disposed to produce a source beam substantially between 808 and 880 nm, for energizing said gain medium and supporting resonance of a resonant light beam along said resonant beam path;
- wherein said source beam may enter said gain medium element to generate a light output in said resonant beam path, said light output may be frequency doubled by said frequency doubling element, and be frequency limited by said prism to form a resonant light beam prior to output by said laser system, and said harmonic separating film may separate from said resonant light beam and provide as an output of said laser system a low-noise light beam substantially at 532 nm.

* * * * *